H. EVANS.
BRAKE BLOCK HOLDER.
APPLICATION FILED JUNE 7, 1910.
992,948.
Patented May 23, 1911.
2 SHEETS—SHEET 1.
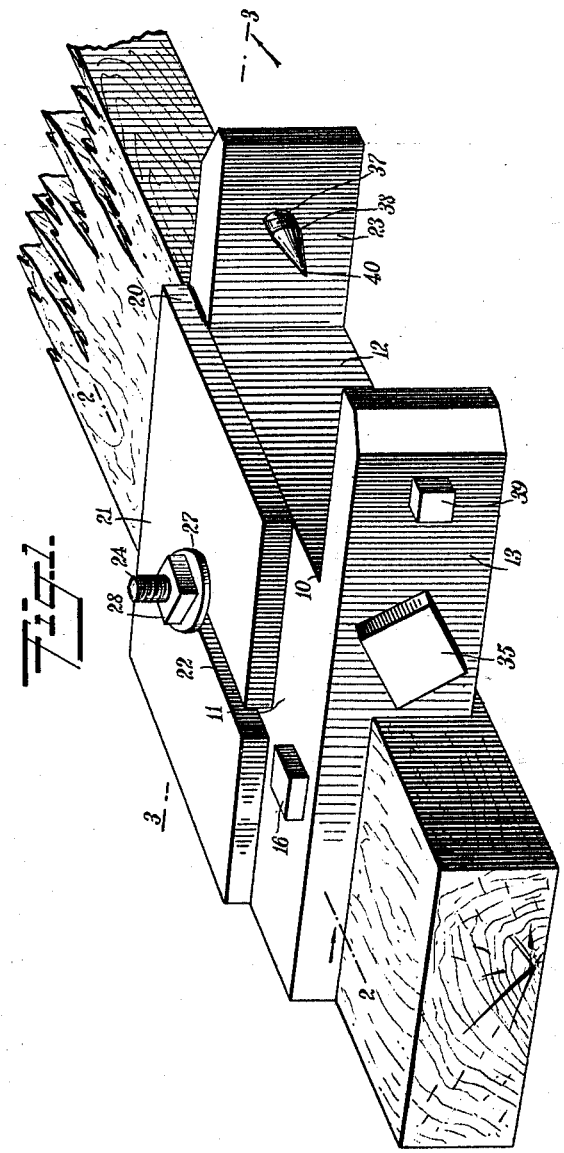
WITNESSES:
INVENTOR
Horace Evans
BY
ATTORNEYS H. EVANS.
BRAKE BLOCK HOLDER.
APPLICATION FILED JUNE 7, 1910.
992,948.
Patented May 23, 1911.
2 SHEETS—SHEET 2.
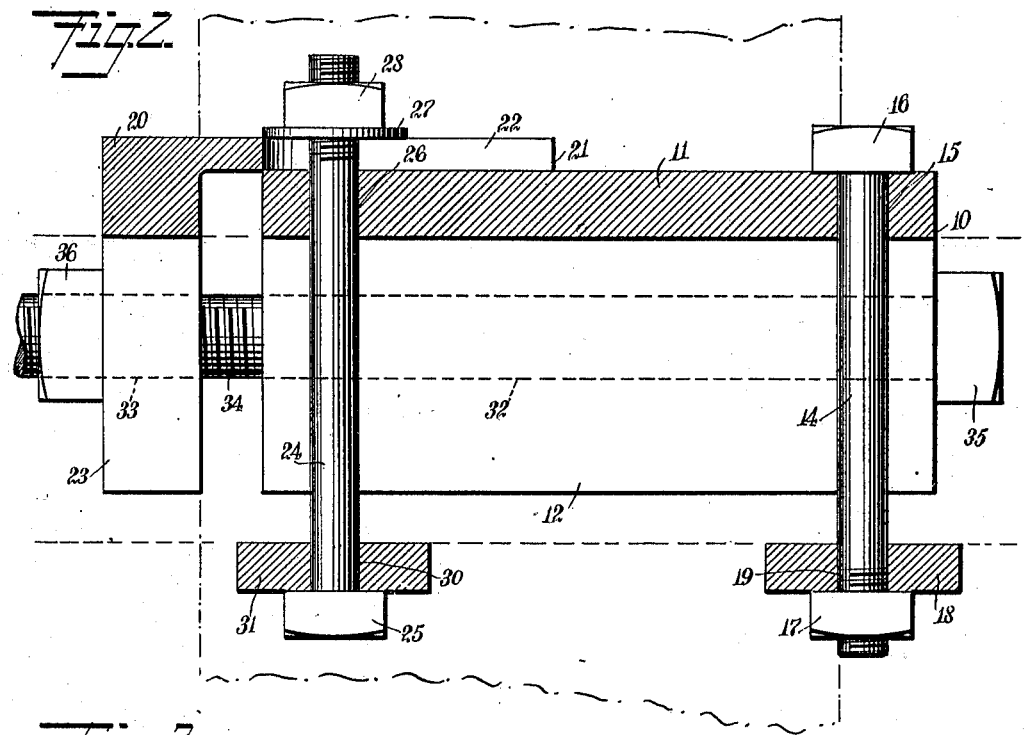
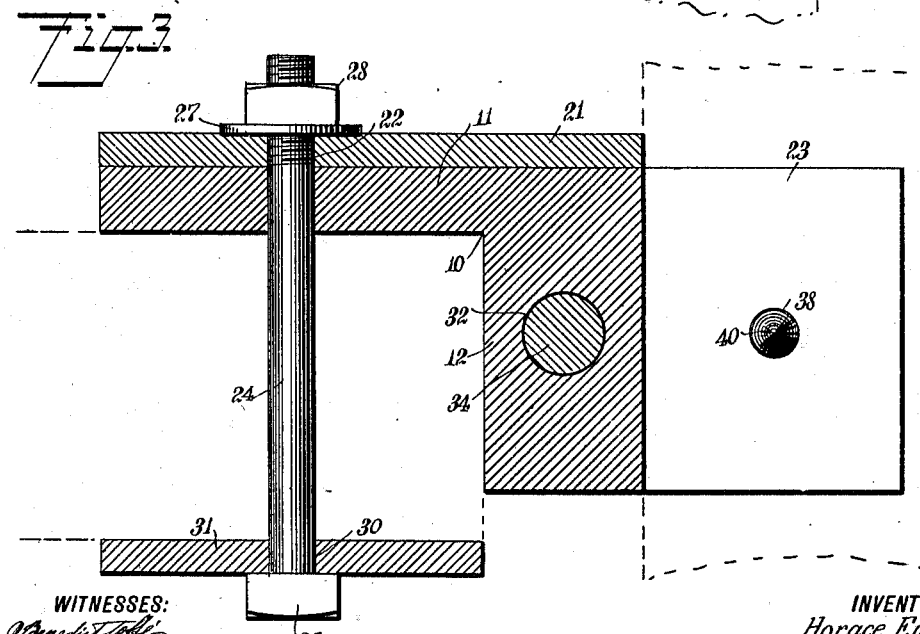
WITNESSES:
INVENTOR
Horace Evans
BY
ATTORNEYS

UNITED STATES PATENT OFFICE.

HORACE EVANS, OF ROSS, WYOMING.

BRAKE-BLOCK HOLDER.

992,948.      Specification of Letters Patent.      Patented May 23, 1911.

Application filed June 7, 1910. Serial No. 565,438.

*To all whom it may concern:*

Be it known that I, HORACE EVANS, a citizen of the United States, and a resident of Ross, in the county of Converse and State of Wyoming, have invented a new and Improved Brake-Block Holder, of which the following is a full, clear, and exact description.

This invention relates to holders for the brake blocks or shoes of farm wagons and other vehicles, and has reference more particularly to a device of this class, comprising a fixed jaw, a movable jaw, and common means for securing the jaws upon a brake beam, and for holding them adjustably relative to one another, the jaws holding the brake block.

The object of the invention is to provide a simple, strong and durable holder for brake blocks or shoes, which can be mounted upon the ordinary brake beam used with farm wagons and other vehicles, which does not necessitate a special construction of the brake beam, which can be easily mounted in place and as easily removed, which permits the use of brake blocks or shoes of different kinds, which is so constructed that an ordinary block of wood or the like can be used as a shoe, and which securely holds the block or shoe against accidental displacement under all circumstances.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a perspective view showing one end of a brake beam having an embodiment of my invention applied thereto; Fig. 2 is an enlarged transverse section on the line 2—2 of Fig. 1; and Fig. 3 is an enlarged longitudinal section on the line 3—3 of Fig. 1.

Before proceeding to a more detailed explanation of my invention, it should be clearly understood that while I prefer to fashion the holder from cast iron, it can also be manufactured from any other suitable material adapted for the purpose. I have shown for example an embodiment of the holder mounted upon an ordinary wooden brake beam of the usual angular cross section. It will be readily seen that the holder can also be securely mounted upon other kinds of brake beams.

Certain of the details of construction form no part of the invention, and can be varied in accordance with individual preference and special conditions, without departing from the underlying spirit of the invention.

Referring more particularly to the drawings, I employ a fixed jaw member 10 having an upper part or plate 11 which rests upon the top of the brake beam. At one side, the part 11 has associated therewith a downwardly disposed flange 12, which engages at the front of the brake beam. An extension 13 forming the jaw proper of the fixed jaw member projects laterally at one end of the part 12, and is integrally connected with the part 12 and the plate 11. A bolt 14 extends removably through a bolt-hole 15 in the part 11 and is arranged in an opening of the brake beam. It has at the upper end a head 16, which seats upon the part 11, and at the lower end has the usual retaining nut 17. I prefer to employ at the under side of the brake beam, a keeper bar 18 having an opening 19 through which the bolt 14 passes. The nut 17 engages at the under side of the keeper bar.

A movable jaw member 20 has an upper part or plate 21 which rests movably upon the part 11 of the fixed jaw member, and is provided with a slot 22 extending part way along the length thereof. At one end the plate 21 has associated therewith an extension 23 constituting the movable jaw. A bolt 24 having at the lower end a head 25, is arranged in an opening of the brake beam, and extends through a bolt-hole 26 of the plate 11 and through the slot 22. It has at the upper end a washer 27 and a retaining nut 28. At the lower end, the bolt extends through an opening 30 of a keeper bar 31 similar to the keeper bar 18. By means of the bolt, the jaw members can be adjustably held relative to one another. The bolt also serves to assist in securing the members upon the brake beam.

An opening 32 extends longitudinally through the flange 12. The jaw extension 23 has an opening 33 which registers with the opening 32. A bolt 34 is positioned in the openings 32 and 33, and has a head 35, which seats at the inner portion of the jaw extension 13. At the other end, the bolt has a retaining nut 36, which engages the jaw extension 23. This bolt also assists in holding the jaw members together. Each of the jaw extensions has a threaded opening 37, in which is located a correspondingly threaded set-screw 38 having at the outside of the jaw extension a head 39. The inner ends 40 of the set-screws are pointed, and project a substantial distance beyond the inner faces of the jaw extensions.

When the jaw members are brought together as closely as possible, the jaw extension 23 of the movable member engages at the end of the flange 12 of the fixed member, as is shown in Fig. 1. The brake block or shoe is clamped between the extensions. The pointed set-screws 38 constitute studs for engaging the block or shoe to hold the same against displacement. It will be understood that the studs penetrate into the block, and if so desired can serve as pivots therefor. As the jaw members are relatively adjustable, brake blocks of different sizes can be accommodated therebetween.

Having thus described my invention, I claim as new, and desire to secure by Letters Patent:

1. A device of the class described, comprising a fixed jaw member having a plate adapted to rest upon the top of a brake beam, and having a jaw extension, a movable jaw member having a plate adapted to rest slidably upon said first plate, and having a jaw extension, said jaw extensions being formed to receive a brake block therebetween, said plate of said movable jaw member being slotted, a bolt for securing said fixed member upon a brake beam and extending through said slot, whereby it serves to secure said members adjustably together, and a second bolt securing said fixed member upon the brake beam.

2. A device of the class described, comprising a fixed jaw member having the body provided with an opening extending longitudinally thereof, a movable jaw member associated with said fixed jaw member and adapted to abut at the end thereof and having an opening adapted to register with said first-mentioned opening, said members having extensions adapted to grip and hold a brake block therebetween, a bolt for securing said fixed member only upon a brake beam, a second bolt for securing both of said members to the brake beam and to hold them adjustably relative to one another, and a third bolt arranged in said registering openings and serving to secure said members together.

3. A device of the class described, comprising a fixed jaw member having a top, a lateral flange, and a jaw extension, said top being adapted to rest upon the top of a brake beam, a movable jaw member having a plate adapted to rest upon said top and having a jaw extension adapted to engage at the end of said flange, said jaw extensions being adapted to hold a brake block therebetween, a bolt for securing said fixed member upon the brake beam, a bolt extending through the brake beam, through said top and said plate, said plate being formed to receive said bolt to permit said plate to move relative to said fixed jaw member, and a bolt for securing said members together directly.

4. A device of the class described, comprising a fixed jaw member having a top, a downwardly disposed flange, and a jaw extension, said top being adapted to rest upon the top of a brake beam and said flange to engage at the front of the brake beam, a movable jaw member having a plate adapted to rest upon said top and having a jaw extension adapted to engage at the end of said flange, said jaw extensions being adapted to hold a brake block therebetween, a bolt for securing said fixed member upon the brake beam, a bolt extending through the brake beam, through said top and said plate, said plate having a slot to receive said bolt, said flange and said jaw extension of said movable member having registering openings, and a bolt located in said registering openings.

5. A device of the class described, comprising a fixed jaw member having a top plate adapted to rest upon the top of a brake beam, a downwardly disposed flange associated with said plate and a jaw extension at one end of said flange, said flange serving to engage at the front of the brake beam, a movable jaw member having a plate adapted to rest movably upon said top plate, and having a jaw extension adapted to engage at the end of said flange, said last-mentioned plate having a slot, said jaw extensions having means for holding a brake block therebetween, a bolt for securing said fixed member upon the brake beam, a bolt extending through the brake beam, said top plate of said fixed member having an opening, said last-mentioned bolt extending through said opening and said slot, said flange having an opening extending longitudinally therethrough, said jaw extension of said movable member having an opening registering with said last-mentioned opening, and a bolt located in said last-mentioned openings and serving to secure said fixed member and said movable member together.

In testimony whereof I have signed my name to this specification in the presence of two subscribing witnesses.

HORACE EVANS.

Witnesses:
F. H. SAWYER,
E. A. SAWYER.

Copies of this patent may be obtained for five cents each, by addressing the "Commissioner of Patents, Washington, D. C."